United States Patent

[11] 3,597,592

[72] Inventors Kenneth E. Graves
San Jose;
John C. Vincer, Campbell; Clarence G. McCune, Balboa, all of, Calif.

[21] Appl. No. 625,112
[22] Filed Mar. 22, 1967
[45] Patented Aug. 3, 1971
[73] Assignee California Computer Products, Inc.
Anaheim, Calif.

[54] INFORMATION ENTRY SYSTEM
16 Claims, 5 Drawing Figs.

[52] U.S. Cl. .......... 235/61.1 R, 234/17
[51] Int. Cl. .......... G06k 1/02, G06k 1/18
[50] Field of Search .......... 235/61.1; 340/172.5; 234/17, 34

[56] References Cited
UNITED STATES PATENTS

| | | | |
|---|---|---|---|
| 3,175,763 | 3/1965 | Gotz et al. .......... | 235/61.1 X |
| 3,183,489 | 5/1965 | Laurer et al. .......... | 235/61.1 X |
| 3,436,010 | 4/1969 | Sponjersberg .......... | 235/61.1 X |
| 3,495,222 | 2/1970 | Perotto et al. .......... | 340/172.5 |

*Primary Examiner*—Daryl W. Cook
*Attorney*—John A. Duffy

ABSTRACT: A system for use in expanding the information entry capabilities of a standard key puncher. The desired programs are punched in standard formats on cards and the standard card reader is used to store these programs in a memory unit. Provision is made for permitting an operator to enter keystroke information at random. This information is stored in the memory until the completion of any preceding automatic punch operation for permitting the entry of optical scanning information in the memory to be retrieved in accordance with the program instructions and for performing automatic "accumulator" and "left zero fill" operations on the stored information. An escapement wheel unit of the key puncher is equipped with an optical sensing system for accurately generating pulses each time the punch and read station cards advance from one column to the next.

INVENTORS.
KENNETH E. GRAVES
JOHN C. VINCER
BY CLARENCE G. MCCUNE

Jack M. Wiseman

ATTORNEY

INVENTORS.
KENNETH E. GRAVES
JOHN C. VINCER
CLARENCE G. MCCUNE
BY
ATTORNEY

INVENTOR
KENNETH E. GRAVES
JOHN C. VINCER
CLARENCE G. MCCUNE
BY Jack M. Wiseman
ATTORNEY

INFORMATION ENTRY SYSTEM

This invention relates in general to data processing equipment, and more particularly to improved means for entering documentary information on standard storage elements such as punched cards, punched tape, magnetic tape and the like.

Such storage elements are used in extracting the information and sorting it for processing by other equipment. For purposes of illustration, the following detailed description will be directed at a format control for a key puncher which is used to store the information on punched cards. However, the use of the system described as a format control on electric typewriters, "Flexowriters," "Computypers" and like devices will be readily apparent to those skilled in the art.

A standard keypunch machine comprises card feeding and stacking machinery, a card punching station, a card reading station, and a program drum. The program drum contains a program card on which is punched a program consisting of a series of instructions. These instructions include a definition of the card field (particular block of card columns) over which a punching operation is to be performed, and also a definition of the particular operation to be performed in this card field. For example, columns 1 through 15 might be used as an address field, columns 16 through 20 as a number field, and so forth through the total number of columns, typically 80, of the card. The standard keypunch machine is capable, upon receipt of a suitable program instruction, of performing certain automatic operations, for example, "skip" or "duplication."

A "skip" instruction from the program drum will cause the punch to advance the cards in the read and punch stations through the designated field without punching any information. A "duplication" instruction from the program drum will cause the pin readers in the read station to detect the hole pattern in a card column of the preceding punched card, whereby the same pattern is punched in the corresponding column of the card in the punch station. During these automatic operations the manual keyboard input to the punch is locked; and errors are frequently caused as a result of the operator attempting to operate the keyboard during the performance of the automatic operations. Since the operator cannot key in information until the punch finishes its automatic operations, and since the punch is capable of accepting information at a rate considerably in excess of that at which the average operator can key, either the operator is waiting for the punch or the punch is waiting for the operator. Much valuable time is thereby wasted during the course of entering documentary information on the cards.

Accordingly one object of the present invention is to improve the continuity and speed with which documentary entries can be made in combination with automatic operations.

Another object of the present invention is to provide means for using a high speed optical reader to aid the operator in the entry of documentary information.

Still another object of the present invention is to provide additional automatic operations for use in connection with the entry of documentary information.

Referring again to the standard keypunch machine, the programs stored on the program cards are read on the program drum by star wheels which move in and out of the program holes as the drum rotates under them, thereby closing contacts which give electrical signals to the punch for machine control. Since there are only 12 punch positions in a column of the standard program card, the number of programs which can be stored on a card is limited to two programs. The entry of information from complex documents frequently required many more programs for a single sheet of information. Thus, with presently available keypunch machines it is necessary to rerun a stack of such complex documents several times with a change of program card between each run.

Accordingly, a further object of the present invention is the provision of means for storing a large number of programs which can be used in the continuous entry of information from a single document.

Another object of the present invention is the provision of means for entering programs punched in standard format on cards into a memory unit by use of a standard keypunch card reader.

Another object of the present invention is the provision of means for providing binary card column indexing information by use of a standard keypunch program drum.

A still further object of the present invention is the provision of means for accurately generating pulses indicative of the motion of the cards in a keypunch machine.

The various features and advantages of the present invention will become more apparent upon a consideration of the following description taken in connection with the accompanying drawing, wherein.

Figure 1:
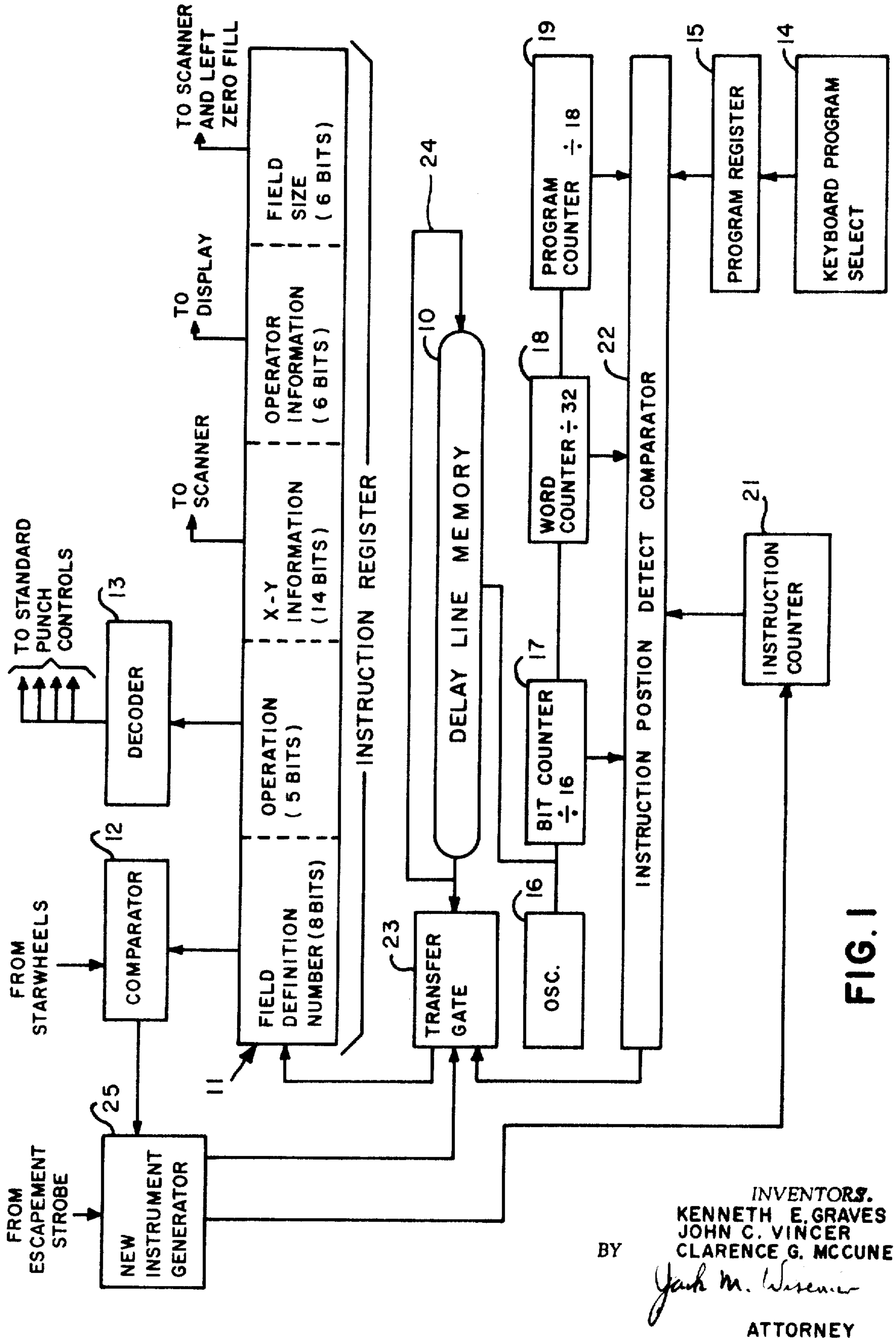
FIG. 1 is a block diagram of an information recovery system used in connection with the entry of data in accordance with present invention.

The specific system shown in the drawing illustrates a typical example of the present invention adapted to expand the capabilities of a standard card keypunch or verifier unit.

Referring to FIG. 1, the program instructions are stored in a memory unit 10, which can be any known device capable of storing and retrieving information at a high rate, such as a core memory, magnetic drum or disc, semiconductor register, or delay line. The number of programs stored is limited only by the size of the memory used for storage. In this specific example, a magnetostrictive delay line is used with a capacity of 12 programs, each program having 16 instructions.

Figure 2:
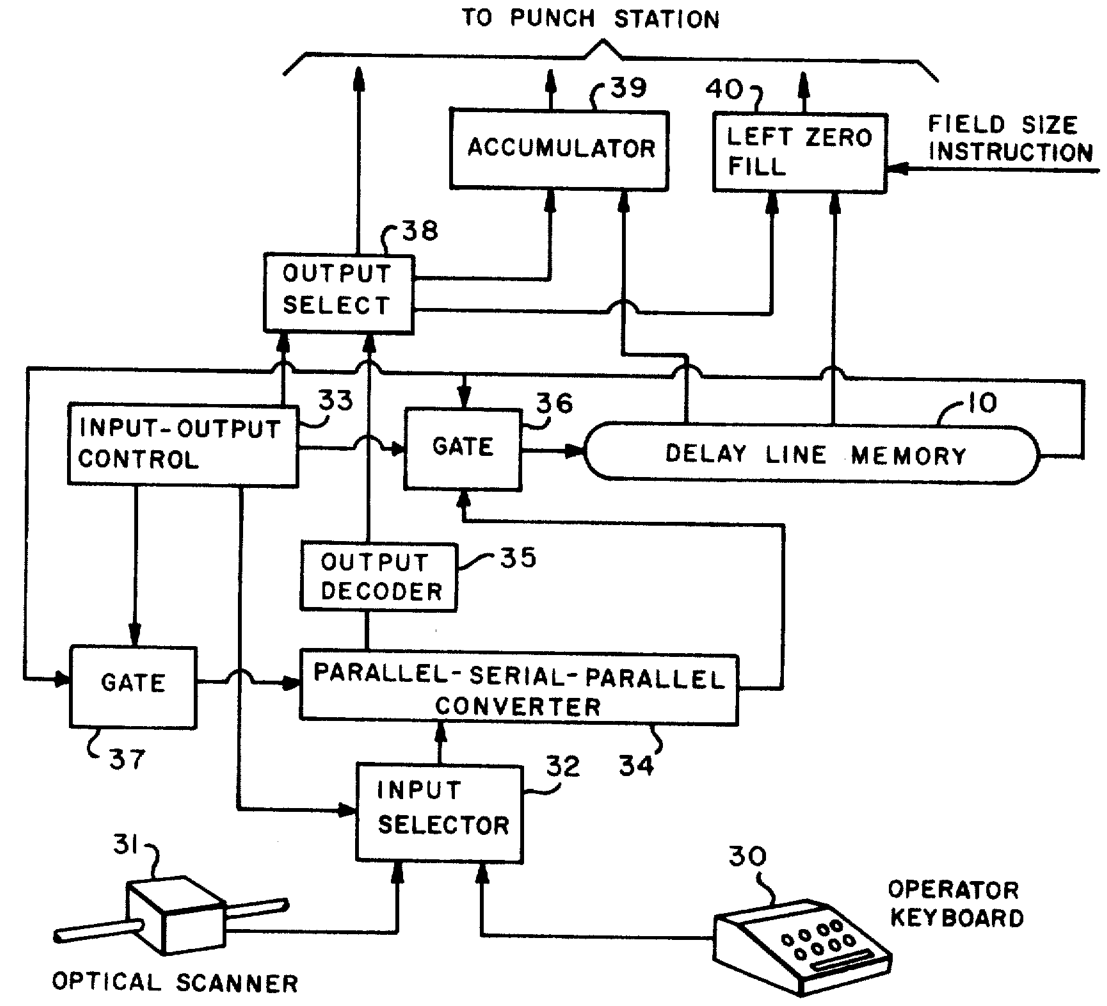
FIG. 2 is a block diagram of a system used for the entry of keystroke and optical scanner information in accordance with the present invention.
Figure 5:
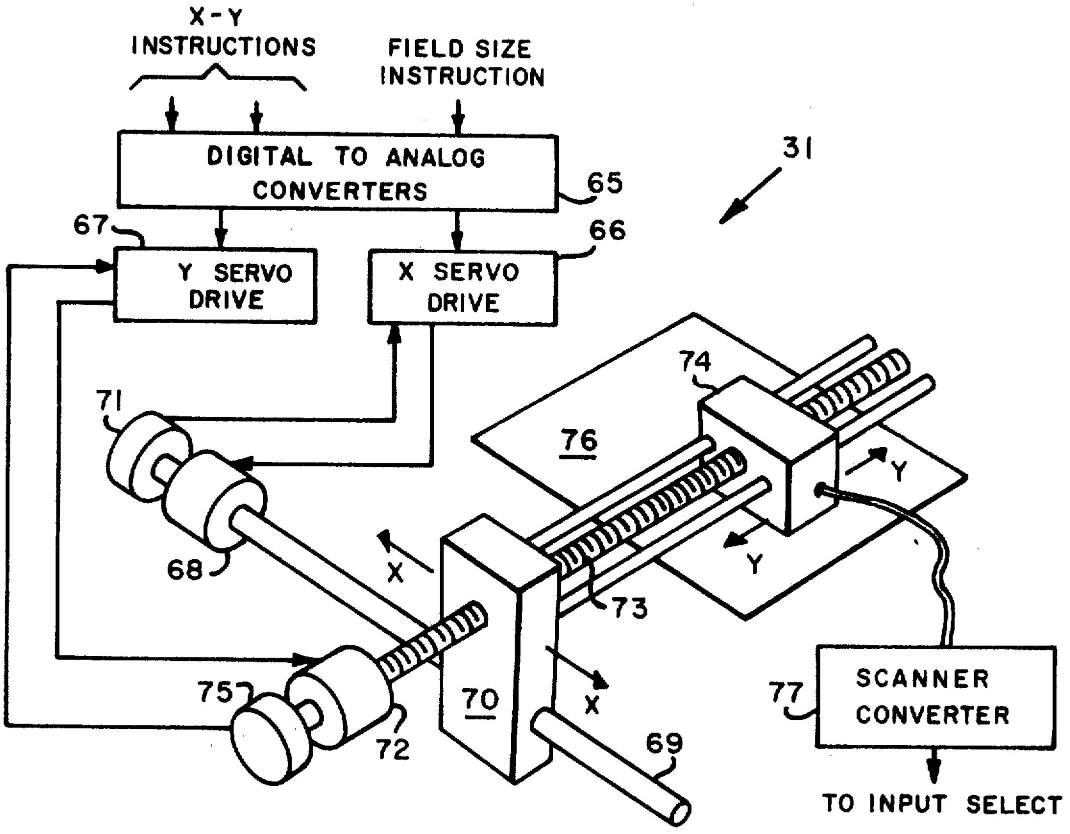
FIG. 5 is a block diagram and diagrammatic perspective view of an optical scanner as used in connection with the systems of FIGS. 1 and 2.

Each instruction contains 39 bits of information which can be entered into an instruction register 11. The first eight bits contain the field definition number (the column of the card at which this particular instruction is to terminate), and this number is fed to a field definition comparator 12. The next five bits, containing the specific operation to be performed, are fed, via a decoder 13, to the standard punch controls of the keypunch. These controls operate the standard automatic operations such as "skip," "duplicate" and "release" and also the individual punching of the cards. The next 14 bits contain X-Y coordinate information and are fed to a scanner carriage control (FIG. 5). The next six bits contain operator information and are fed to a suitable display (not shown) for providing the operator with up to 25 different visual instructions such as "skip if blank," "punch alphabetic," "program numbers," "-field size," "scanner in operation" etc. Finally, the last six bits contain the field size (number of card columns involved in the particular operation) and these bits are fed to the scanner carriage control (FIG. 5) and a "left zero fill" unit (FIG. 2).

To operate the program selection system of FIG. 1, the operator selects a particular program (set of instructions) by entry from a keyboard program selector 14 into a program register 15. The information stored in the memory unit 10 is indexed and located by a clock oscillator 16 which simultaneously drives the delay line of memory unit 10 and the following three delay line position counters: a bit counter 17, a word counter 18, and a program counter 19. These counters have frequency division ratios of 16, 32 and 18, respectively. An instruction counter 21 is initially set to zero. As soon as the program is set into the program register 15, the output of the counter 21 and the program register 15 is compared in a comparator 22 with the output of the delay line position counters 17, 18 and 19. When the delay line memory 10 is in such position that the inputs to the comparator 22 match, the comparator 22 actuates a transfer gate 23, whereby the information is shifted from the memory unit 10 into the instruction register 11.

The information is also recirculated through the delay line of memory unit 10, through a feedback path 24 so that this information is retained in storage. The punch now begins to operate on the instruction set into the register 11, and continues until the punch settles in the card column corresponding to the field definition number of the instruction register. To accomplish this, the standard program card on the program drum of the keypunch is replaced by a card in which each column has the binary number punched therein which corresponds to the number of said column—from one to 80 on a standard size card. Since the program drum card rotates under the standard star wheels in synchronism with the advance of the card being punched, the output of the star wheels is simply a binary signal representative of the card column being punched. This star wheel signal is compared in the comparator 12 with the field definition number in the program register, and when the card being punched has advanced to the column corresponding to the field definition number, the comparator 12 actuates a new instruction request generator 25. At the moment the punch leaves this field definition column, a strobe signal is generated (FIG. 4) and fed to the generator 25, whereby the generator 25 energizes the instruction counter 21, which is advanced to the next instruction number, and the foregoing process is repeated instruction by instruction until the program is completed and a new program is selected by the operator. At the end of certain specified fields, control can be transferred to other programs in the memory by automatic "jump" instruction.

It should be noted that in accordance with the present invention the standard program card is not used on the program drum to provide the program instructions. This is done by the memory unit 10, and thus any desired number of programs may be stored, as opposed to the limit of two programs available with the standard program card. As described above, the standard program card is replaced by a simple column indexing card so that the star wheels on the program drum generate a column indexing signal for the program recovery system of FIG. 1. In order to accomplish this, the standard output lines of the star wheels are disconnected from the punch controls and run to the comparator 12 in the system of FIG. 1.

FIG. 2 illustrates further elements added to the system of FIG. 1 for the purpose of storing the output of either a manual operator keyboard 30 or an optical scanner 31, and for adding automatic "accumulator" AND "left zero fill" operations to the standard automatic keypunch operations. The keyboard 30 is a standard keypunch keyboard which is disconnected from the punch controls and run to the memory system as shown in FIG. 2. In this system, information is first stored in the memory unit 10 and then recalled as needed. Thus, if the punch is in the process of performing an automatic punch operation, the operator need not wait until the operation is finished but can begin to enter keystroke information into the memory unit 10, which information will be recalled when the automatic operation is completed. When the optical scanner 31 is used, the instructions for moving the scanner are obtained from the X-Y and field size bits of the instruction register (FIGS. 1 and 5), and then as the scanner reads a document in accordance with these instructions, the characters read are stored in the memory unit 10 for recall after the scanning instruction is completed. This capability greatly increases the speed with which a document can be entered onto punch cards in a standard keypunch, thereby reducing operator time, and, where the keystroke or scanner information is being transmitted over long distance lines, reducing the time during which the lines must be open.

These functions are accomplished in FIG. 2 by actuating an input selector 32, with a control unit 33, to pass either the keystroke of scanner information to a parallel-serial-parallel converter 34. In the event the keystroke information is selected, the output is passed to the punch station through the converter 34 and a decoder 35 when no automatic punch operation is then being performed. However, if an automatic operation is then being performed, a gate 36 is opened by the control 33 and the keystroke information is stored in the memory unit 10 until the operation is completed, whereupon the control 33 opens a gate 37 to permit the stored keystroke information to be reinserted in converter 34 and passed to the punch station. In the event scanner information is selected, the control 33 opens the gate 36 for storing the output in memory unit 10 until completion of the scanning, whereupon the control 33 opens the gate 37 for passing the stored information to the punch station, via the converter 34 and the decoder 35. It should be noted that the storing of the scanner information permits asynchronous data from the scanner to be synchronized with the punch as it operates on the card. The keystrokes or scanning characters are stored in the memory unit 10 in indexed locations. The storage and retrieval of this information by control 33 is made by setting up program and word comparators in the same manner as that described with respect to FIG. 1 for the instruction retrieval.

The output selector 38 is used either to pass the output of decoder 35 directly to the punch, or via an accumulator unit 39 or a left zero fill unit 40, as desired. The accumulator function allows a cross check of the validity of the scanner or operator entered information. As an example, many banking documents contain columnar decimal information with a total amount printed at the bottom of the columnar information, and during the punching operation, the numbers are separated onto different cards. The accumulator 39 represents a given location in memory unit 10 into which each such number is inserted for addition as it is punched. Upon completion of the entry of the columnar information, the sum content of the memory location is punched into a card by depression of a control key. This sum is then compared with the total printed on the document. If the two are equal, no error has been made by the scanner or operator. In many cases this will permit the bypassing of the usual repunching verification operation.

The left zero fill function automatically placed the required number of zeros to the left of the significant digits in a given size of number field. The left zero fill unit 40 represents the storage of the significant digits in the memory unit 10. The field size instruction from the instruction register 11 (FIG. 1) is used to calculate the number of zeros which must be added to the left of the significant digits to obtain the given field size. These required zeros are then punched automatically on the card before the significant digits are brought from memory and punched on the card.

Figure 3:
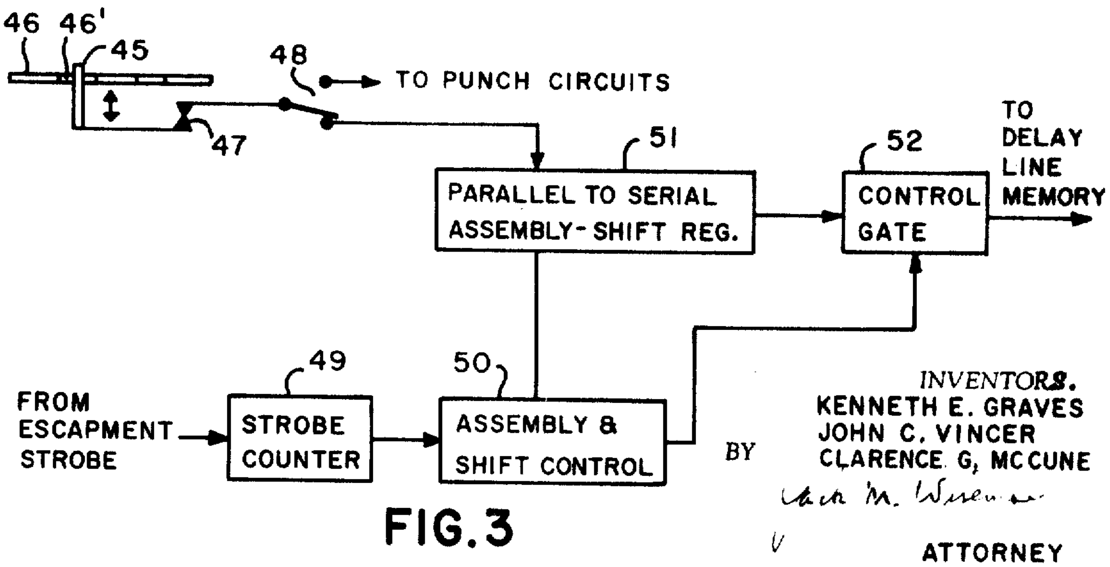
FIG. 3 is a block diagram of a system in accordance with the present invention for entering programs punched on cards into the memory unit of the system of FIG. 1.

Various known means may be used for storing the operating programs in the memory unit 10, including external card readers, paper punch readers, and magnetic tape readers. FIG. 3 illustrates a particularly convenient arrangement which utilizes the existing standard punch read station of the keypunch. In the standard operation of the punch read station, a series of 12 pins probe each column of the card being read as said card advances through the station. A hole in any of the 12 positions of the column causes a circuit to be closed to thereby generate a signal. Normally these signals are used in the automatic "-duplication" operation to punch corresponding holes in the card at the punch station. In the arrangement of FIG. 3, a standard spring-loaded pin reader 45 probes one of the 12 hole locations of a punch card 46. Upon encountering a hole 46' in this location, the pin 45 projects by force of the spring loading through the hole 46' to thereby close a relay 47 and generate a signal. The desired operation is obtained by the introduction of a multipole relay 48 in series with each pin reader.

In normal automatic duplication operations, the relay 48 is in the "up" position and contacts the standard punch circuits. To effect program entry into the memory unit 10 in accordance with the present invention, the relay 48 is placed in the "down" position as shown, and the card 46 has the desired program punched therein in a standard card format. For example, the first four columns identify the program and each succeeding block of four columns carries a separate instruction of said program. An escapement strobe input (FIG. 4) provides a pulse to a counter 49 each time the card advances by one column. An assembly and shift control unit 50 receives the output from the counter 49 and actuates a parallel to serial assembly-shift register unit 51 and a control gate 52. After each separate instruction is passed through the gate 52 to the memory unit 10, the accounting circuitry is updated to accept the sequence of columns for the next instruction and store said instruction in the next sequential memory location in the program storage area of the memory unit 10. When the needed programs have been stored in the memory unit 10, the relay 48 is returned to its normal "up" position.

Figure 4:
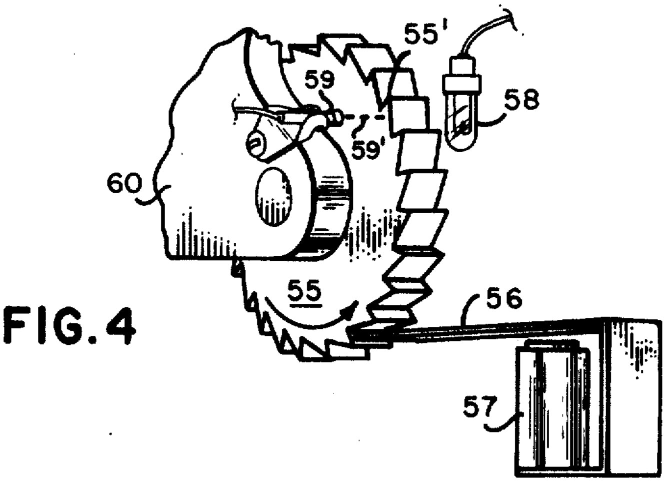
FIG. 4 is a diagrammatic perspective view of an optical system in accordance with the present invention for generating pulses as an indication of the advancement of the cards in a keypuncher.

FIG. 4 illustrates the mechanism, in accordance with the present invention, for generating strobe pulses immediately upon the advancement of the card out of a given column, such pulses being used both in the program storage system (FIG. 3) and in the instruction recovery system (FIG. 1) as previously described. This is accomplished at the location of the standard escapement wheel unit of the keypuncher. This escapement wheel unit comprises a toothed escapement wheel 55 which is biased to turn counterclockwise as shown in FIG. 4, and is restrained by a pawl 56 which successively engages sharp leading edges 55' on the teeth of the wheel 55. In normal operation, the wheel 55 is synchronized with the advancement of the cards in the read and punch stations. The number and spacing of the teeth correspond directly with the number and spacing of the columns on the cards. The cards are advanced one column at a time by releasing the pawl 56 upon energization of a relay electromagnet 57 for a sufficient period to permit the next tooth to be rotated into engagement.

In accordance with the present invention, a lamp 58 is mounted on one side of the escapement wheel 55 and casts a shadow of the wheel to the other side. A photocell 59 is mounted to a bearing plate 60 on this other side of the escapement wheel 55. The optical reception axis 59' of the photocell 59 is directed slightly below the outermost extension of the tooth edge 55' of one of the teeth when the escapement wheel 55 is in its engaged stationary state. In this position, said tooth blocks the light of lamp 58 from entering the photocell 59. Upon energization of the electromagnet 57 and resulting counterclockwise movement of the escapement wheel 55, the reception axis 59' of the photocell 59 moves off of the tooth, whereupon light immediately enters the photocell 59 to initiate a strobe pulse which is then terminated as the next tooth moves into the stationary position to block the light from the lamp 58. Thus, as the escapement wheel 55 turns with the advancement of the cards in the read and punch stations, a strobe pulse is generated immediately upon the movement out of each successive column of the read and punch station cards.

The details of the optical scanner 31 (FIG. 2) are shown in FIG. 5. The X-Y coordinate information and the field size information from the instruction register 11 (FIG. 1) are fed via digital-to-analog converters 65 to an X servo drive circuit 66 and a Y servo drive circuit 67. The circuit 66 controls an X servomotor 68 which turns an X screw 69 to thereby position an auxiliary head 70 along the X direction. The X position of the head 70 is sensed by a potentiometer 71 connected in feedback relationship with the servo circuit 66. The circuit 67 controls a Y servomotor 72 which turns a Y screw 73 to thereby position a scanning head 74 along the Y direction relative to the auxiliary head 70. The Y position of the head 74 is sensed by a potentiometer 75 connected in feedback relationship with the servo circuit 67. The X position of the scanning head 74 is the same as the X position of the auxiliary head 70, since the Y screw 73 is fixed in the auxiliary head 70. The X-Y information drives the motors 68 and 72 to position the scanning head 74 to an initial position on a document 76 which is to be read by the scanner. The field size information determines the number of characters to be scanned along the line beginning with the initial position and continuing in a direction determined by the X-Y instruction input. The characters picked up by the scanning head 74 are converted by a converter 77 into digital information which is then transmitted to the input selector 32 (FIG. 2) for storage in the memory unit 10.

To summarize the overall operation of the system shown in the drawings, the desired programs are punched in standard formats on cards 46 (FIG. 3) and stored in the memory unit 10. The desired program is selected by use of keyboard program select unit 14 (FIG. 1). Operation is then automatic as each instruction operates on the card field associated with the particular instruction. Documentary information is entered either by the manual keyboard 30 or the optical scanner 31 (FIG. 2), and as each entry segment is completed, a new instruction and scanning position (if any) is issued from the instruction register 11 (FIG. 1). This procedure is repeated until all the desired information is extracted from the document.

It is to be understood that modifications and variations of the embodiments of the invention disclosed herein may be resorted to without departing from the spirit of the invention and scope of the appended claims.

Having thus described my invention, what we claim as new and desire to protect by Letters Patent is:

1. In a system for entering documentary information on punched cards, the combination comprising: (means for entering information by automatic operation onto punched cards);
   means for generating inputs in accordance with externally supplied data;
   memory means responsively connected to said input generating means for storing said generated inputs;
   means for storing card punch program instructions;
   means for retrieving said generated inputs from said memory in accordance with instructions stored in said means for storing said program instructions;
   means responsively connected to said retrieving means for entering information by automatic operation onto punched cards.

2. The combination according to claim 1 wherein said inputs are generated randomly by manual operation and are stored in said memory means for retrieval upon termination of any preceding automatic operation.

3. The combination according to claim 1 wherein said inputs are generated by an optical scanner.

4. The combination according to claim 1 wherein said generated inputs are representative of a series of numbers, each number being entered on a separate storage element, and further including memory means for accumulating said numbers and providing an indication of the sum of said series numbers after said series of numbers have been entered.

5. The combination according to claim 1 wherein said generated inputs are representative of the significant figures of a series of numbers, and further including memory means for sequentially storing said significant figures, and means defining a given number of figures for entering said significant figures on said storage element with sufficient zeros to the left thereof that the sum of the number of said zeros plus the number of said significant figures equals said given number of figures.

6. In a system for entering documentary information on punched cards, the combination comprising: a memory unit having a plurality of card punch program instructions stored therein; means for retrieving a desired sequence of program instructions from said memory; means for generating inputs in accordance with externally supplied information; means for storing said generated input in said memory unit; and means for retrieving said generated inputs from said memory in accordance with said program instructions.

7. In a system according to claim 6 wherein said recording medium is a punched card and comprising a keypuncher having a program drum adapted to receive a card thereon and a punch station adapted to receive a card therein, said drum being adapted to rotate in synchronism with the advancement of said punch station card, further including, in combination:

means for generating digital signals representative of the rotation of said program drum by means of a card adapted to be placed on said drum, said card having a punched binary code in each column thereof representative of the number of said column; and means responsive to said digital signals for locating the instruction of said program for each of said card columns.

8. In a system according to claim 6 wherein said recording medium is a punched card and comprising a keypuncher having a punch station adapted to move a card therethrough, column by column, by means of an escapement wheel having teeth thereon of number and spacing corresponding to the number and spacing of the columns of said card, further including, in combination: means for generating optical energy; and means for receiving said optical energy, said receiving means being positioned so that a tooth of said escapement wheel blocks said optical radiation from entering said receiving means when said escapement wheel is stationary, corresponding to the positioning of a given column of said card in said punch station, said tooth moving from said blocking position upon initiation of the advancement of said wheel from said given column position whereby a pulse is generated in said optical receiving means.

9. The combination according to claim 8 and further including means responsive to said pulses for initiating the retrieval of a program instruction for the punch card column following said given column.

10. In a system for entering information punched on cards into a memory unit, said cards being adapted to movement through the card reading station of a keypuncher by means of an escapement wheel having teeth thereon of number and spacing corresponding to the number and spacing of the columns of said card, and said card reading station having means for generating signals representative of the pattern of holes in said card including means for generating optical energy, and means for receiving said optical energy, said receiving means being positioned so that a tooth of said escapement wheel blocks said optical radiation from entering said receiving means when said escapement wheel is stationary, corresponding to the positioning of a given column of said card in said reading station, said tooth moving from said blocking position upon initiation of the advancement of said wheel from said given column position, whereby a pulse is generated in said optical receiving means each time said card is advanced by one column; said system also including means for directing said signals to said memory unit; and means responsive to the position of said card in said card reading station for identifying the beginning and the end of a group of signals, whereby the signals corresponding to a particular instruction to be stored in memory may be identified.

11. In a keypuncher including a card station adapted to move a card, column by column, therethrough by means of an escapement wheel having teeth thereon of number and spacing corresponding to the number and spacing of the columns of said card, the combination comprising: means for generating optical energy; and means for receiving said optical energy, said receiving means being positioned so that a tooth of said escapement wheel blocks said optical radiation from entering said receiving means when said escapement wheel is stationary, corresponding to the positioning of a given column of said card in said reading station, said tooth moving from said blocking position upon initiation of the advancement of said wheel from said given column position, whereby a pulse is generated in said optical receiving means each time said card is advanced by one column and said pulses provide an indexing indication for the position of said card in said reading station.

12. An apparatus for punching cards comprising in combination: a first memory means for storing a plurality of programs each having at least one instruction; card reading means for generating signals corresponding to the punch marks on a program card; transfer means responsive to the signals from said card reading means for entering the data represented by each instruction into said memory; feed means for advancing cards through said read station; a keyboard; a second memory means for storing keystroke data; means for punching data cards in accordance with the instructions and data stored in said first and second memory means whereby a plurality of card punching operations may be carried out in accordance therewith.

13. The apparatus recited in claim 12 wherein said means for punching data cards comprises: a punch station; means for retrieving instructions from said first memory means; means for decoding said instructions so as to actuate said punch station in accordance with the data stored in said first and second memory means.

14. An apparatus which may be responsively connected to a card punch machine of the type having a punch station, read station and keyboard comprising: means for encoding the read station signals into digital data information; memory means for storing the digital data from the read station encoding means whereby instructions and other data from a plurality of punched cards may be retained and used for subsequent punching operations.

15. The apparatus recited in claim 14 wherein is included: means for encoding the keyboard signals into digital data information; a second memory means for storing the encoded keystroke data for subsequent punching operations whereby an operator may key in data while other automatic operations are being carried out under the control of instructions stored in said first memory means.

16. The apparatus recited in claim 15 wherein is included: means for retrieving instructions and data stored in said first and second memory means; means for decoding said instructions and data to generate commands for operating the punch mechanism of the card punch machine whereby a batch of cards may be processed in accordance with the programs and data stored in said first and second memory units.